United States Patent
Lu et al.

(10) Patent No.: US 10,810,253 B2
(45) Date of Patent: Oct. 20, 2020

(54) INFORMATION DISPLAY METHOD AND DEVICE

(71) Applicant: BEIJING XIAOMI MOBILE SOFTWARE CO., LTD., Beijing (CN)

(72) Inventors: Yizhan Lu, Beijing (CN); Gang Chun, Beijing (CN); Yuguang Fan, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 193 days.

(21) Appl. No.: 15/996,190

(22) Filed: Jun. 1, 2018

(65) Prior Publication Data

US 2018/0349417 A1 Dec. 6, 2018

(30) Foreign Application Priority Data

Jun. 5, 2017 (CN) .......................... 2017 1 0414608

(51) Int. Cl.
| | | |
|---|---|---|
| G06F 7/00 | (2006.01) |
| G06F 16/532 | (2019.01) |
| G06F 16/903 | (2019.01) |
| G06F 16/583 | (2019.01) |
| G06F 16/432 | (2019.01) |
| G06F 3/0482 | (2013.01) |

(52) U.S. Cl.
CPC .......... *G06F 16/532* (2019.01); *G06F 3/0482* (2013.01); *G06F 16/434* (2019.01); *G06F 16/583* (2019.01); *G06F 16/90335* (2019.01)

(58) Field of Classification Search
None
See application file for complete search history.

(56) References Cited

U.S. PATENT DOCUMENTS

| | | | |
|---|---|---|---|
| 9,135,517 B1 * | 9/2015 | Adams ............... G06K 9/00463 707/707 |
| 9,582,482 B1 | 2/2017 | Sharifi |
| 9,762,651 B1 | 9/2017 | Sharifi |
| 9,788,179 B1 | 10/2017 | Sharifi |
| 9,798,708 B1 | 10/2017 | Sharifi |
| 9,811,352 B1 | 11/2017 | Sharifi |

(Continued)

FOREIGN PATENT DOCUMENTS

| | | |
|---|---|---|
| CN | 102945130 A | 2/2013 |
| CN | 105354207 A | 2/2016 |

(Continued)

OTHER PUBLICATIONS

Supplementary European Search Report in European Application No. EP18176012.5, dated Jul. 31, 2018, 10 pages.

(Continued)

*Primary Examiner* — Alexandria Y Bromell
(74) *Attorney, Agent, or Firm* — Arch & Lake LLP

(57) ABSTRACT

The present disclosure relates to an information display method and device. The method includes: displaying a user interface of an application, where the user interface includes at least one picture; receiving a selection operation triggered on the user interface, where the selection operation is configured to select a target picture from the at least one picture; acquiring search result information corresponding to content of the target picture; and displaying the search result information.

18 Claims, 15 Drawing Sheets

(56) References Cited

U.S. PATENT DOCUMENTS

| | | | |
|---|---|---|---|
| 9,824,079 B1 | 11/2017 | Sharifi | |
| 9,886,461 B1 | 2/2018 | Sharifi | |
| 9,916,328 B1 | 3/2018 | Sharifi | |
| 2012/0083294 A1 | 4/2012 | Bray | |
| 2014/0080428 A1 | 3/2014 | Rhoads | |
| 2015/0106403 A1* | 4/2015 | Haverinen | G06F 16/21 707/792 |
| 2015/0163345 A1 | 6/2015 | Cornaby | |
| 2015/0304797 A1 | 10/2015 | Rhoads | |
| 2016/0117347 A1* | 4/2016 | Nielsen | G06F 16/5838 707/738 |
| 2017/0215028 A1 | 7/2017 | Rhoads | |
| 2018/0075066 A1* | 3/2018 | Zhang | G06F 16/10 707/707 |

FOREIGN PATENT DOCUMENTS

| | | | |
|---|---|---|---|
| CN | 105637509 A | 6/2016 | |
| EP | 2743846 A2 | 6/2014 | |

OTHER PUBLICATIONS

First Office Action issued to European Application No. 18176012.5, dated Jan. 22, 2020, (9p).

First Office Action issued to Chinese Patent Application No. 201710414608.2 dated Apr. 3, 2020 with English translation, (18p).

* cited by examiner

INFORMATION DISPLAY METHOD AND DEVICE

CROSS-REFERENCE TO RELATED APPLICATIONS

This application is filed based upon and claims priority to Chinese Patent Application of International Application No. 201710414608.2, filed on Jun. 5, 2017, the entire contents of which are incorporated herein by reference for all purposes.

TECHNICAL FIELD

The present disclosure generally relates to the technical field of communications and computer processing, and more particularly, to an information display method and device.

BACKGROUND

Along with development of the electronic technology, mobile terminals have been widely used. A mobile terminal may not only provide a basic calling function but also may provide functions of displaying a picture, connecting to the Internet and the like. A picture displayed by a mobile terminal may be from the mobile terminal, or may also be from the Internet. If a user is interested in a certain picture, the user may search the picture to obtain more information. However, when searching a picture, the operation may be complicated, and additionally, the similar picture searched may not reflect the content that the user needs. This is a problem to be solved.

SUMMARY

The present disclosure provides a method, a device and a non-transitory computer-readable storage medium for information display.

According to a first aspect the present disclosure, an information display method is provided. The method may include: displaying a user interface of an application, where the user interface may include at least one picture; receiving a selection operation triggered on the user interface, where the selection operation may be configured to select a target picture from the at least one picture; acquiring search result information corresponding to content of the target picture; and displaying the search result information.

According to a second aspect of the present disclosure, an information display device is provided. The device may include: a processor; and a memory for storing instructions executable for the processor; where the processor is configured to: display a user interface of an application, where the user interface includes at least one picture; receive a selection operation triggered on the user interface, the selection operation being configured to select a target picture from the at least one picture; acquire search result information corresponding to content of the target picture; and display the search result information.

According to a third aspect of the present disclosure, a computer-readable storage medium is provided for information display. The computer-readable storage medium may include instructions, and when the instructions are executed, the instructions may cause the processor to perform: displaying a user interface of an application, where the user interface includes at least one picture; receiving a selection operation triggered on the user interface, where the selection operation is configured to select a target picture from the at least one picture; acquiring search result information corresponding to content of the target picture; and displaying the search result information.

It should be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

Figure 1:
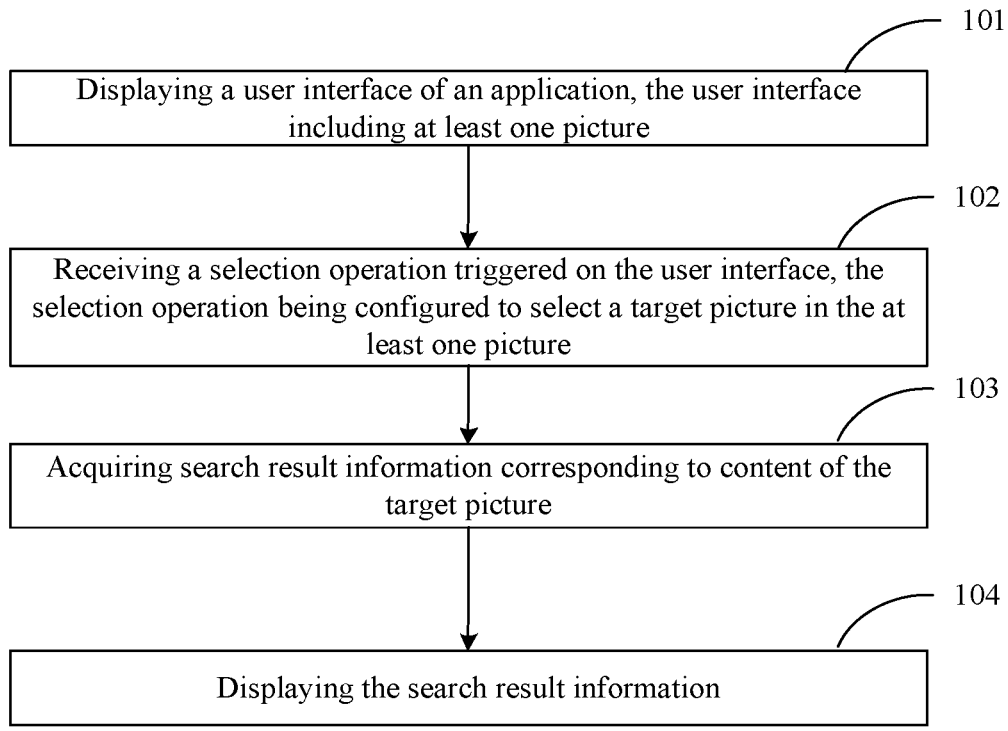
FIG. 1 is a flow chart showing an information display method, according to an example.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure. Instead, they are merely examples of apparatuses and methods consistent with aspects related to the present disclosure as recited in the appended claims.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

In the technology field, a mobile terminal may display a picture in a local server or a website, a user who intends to know about more information about the picture may perform searching through the Internet, and an operating process mainly includes: if it is a picture on the Internet, clicking the picture; prompting a save option, and clicking save to locally save the picture; and quitting a current application or interface, entering a search engine, importing the picture and searching the related information of the picture. It can be seen that the operating process is relatively tedious and a user experience is negatively affected. In addition, for all pictures, the same search strategy is adopted. A search result may not be accurate. Moreover, when the search is performed according to a picture, a similar picture is usually searched only by virtue of characteristics of a color, texture and the like of the picture.

In order to solve these problems, as an example, in an application capable of displaying pictures, a user may execute a selection operation on a picture of interest to trigger acquisition of search result information corresponding to content of the picture. The user may trigger searching of the content of the picture by the selection operation for the picture, so that an operation performed by the user is significantly simplified. Moreover, the search result information corresponds to the content of the picture, and the search result information acquired is according to a practical meaning of the picture, and such a search is not limited to color and texture characteristics of the picture compared with searching of a similar picture.

FIG. 1 is a flow chart showing an information display method, according to an example. As shown in FIG. 1, the method may be implemented by equipment such as a mobile terminal. The method may include the following steps.

In Step 101, a user interface of an application is displayed, and the user interface includes at least one picture.

In Step 102, a selection operation triggered on the user interface is received, the selection operation may be configured to select a target picture in the at least one picture.

In Step 103, search result information corresponding to a content of the target picture is acquired.

In Step 104, the search result information is displayed.

The selection operation in the example may be a gesture operation, and the gesture operation includes, but not limited to at least one of: a long pressing operation, a pressure touch operation, a multiple click operation, a suspended touch operation or a double-finger touch operation.

Wherein, the long pressing operation is an operation of which a touch screen pressing duration exceeds a first duration; the pressure touch operation is an operation of which the pressing pressure exceeds a preset pressure value; the multiple click operation is an operation of which a click frequency within a predetermined duration exceeds a preset frequency; the suspended touch operation is an operation of which a duration of suspension over a touch screen exceeds a second duration; and the double-finger touch operation is an operation of simultaneously clicking the touch screen by a user with two fingers.

An operating system in the mobile terminal may keep running a triggering service in a search program, and the trigger service keeps monitoring whether there is a selection operation for the pictures or not. If the selection operation is captured, equivalently, the selection operation triggered on the user interface is received, an acquisition service in the search program is triggered to acquire the search result information corresponding to the content of the target picture, and a display service displays the search result information.

In the example, such application programs may be all application programs capable of displaying pictures. The application programs include, for example, an album application, a social application, a news application and a browser application.

For example, the user is browsing the album application and a user interface of the album application is an interface on which photos are displayed. If the user is interested in a certain friend photo (i.e. picture) and intended to acquire more information about a corresponding friend, the user may perform the selection operation such as long pressing on the friend photo. After receiving the long pressing operation, the mobile terminal searches a local phonebook for a friend portrait according to the friend photo, and can determine the friend when the friend portrait is found, and further acquire contact information of the friend. In other case, other photos of the friend are searched in a local album according to the friend photo.

For another example, the user is browsing the news application, a user interface of the news application is an interface on which news content is displayed, and the news content may include a picture. If the user is interested in a picture of a certain public character and intended to acquire more information about the public character, the user may perform the long pressing operation on the picture of the public character. After receiving the long pressing operation, the mobile terminal searches the Internet for description information about the picture of the public character according to the picture of the public character, and can determine the public character and further acquire a resume, recent news and the like of the public character.

For another example, the user is chatting with a friend through the social application and the friend sends a real scene picture to the user. If the user is intended to know about a specific position (such as a street name or a house number), navigation information or the like of the real scene picture, the user performs the selection operation on the real scene picture. The mobile terminal matches the real scene picture with a real scene picture in a navigation application, and in case of successful matching, acquires the specific position, navigation information and the like corresponding to the real scene picture through the navigation application.

For another example, the user is browsing the news application, the user interface of the news application is an interface on which news content is displayed and the news content may include a picture. If the user is interested in a certain picture, the picture may be, for example, a still of a movie, and the user may intend to acquire more information about the movie, the user may perform the long pressing operation on the still picture. After receiving the long pressing operation, the mobile terminal searches the Internet for description information about the still picture according to the still picture, and can determine the specific movie to which the still picture belongs and further acquire a brief introduction about a content of the movie, introductions about actors, comment information, a detail page of an e-commerce platform where a movie ticket is purchased and the like.

For another example, the user is browsing pictures published by a friend through the social application. If the user is interested in a certain picture, the picture may be, for example, a picture of a lady bag, and the user may intend to acquire more information about the lady bag, the user may perform the long pressing operation on the picture. After receiving the long pressing operation, the mobile terminal searches the Internet for description information, price information, detail page of an e-commerce platform where the lady bag is purchased and the like for the lady bag according to the picture.

From the examples, it can be seen that: in the example, in an application capable of displaying pictures, the user may perform the selection operation on a picture of interest to trigger acquisition of search result information corresponding to content of the picture. The user may trigger searching of the content of the picture by the selection operation for the picture, so that an operation performed by the user is significantly simplified, and acquisition efficiency of the search result information is improved. Moreover, in the example, the search result information is acquired according to the content of the picture, which is not limited to color and texture characteristics of the picture, and the acquired search result information is not limited to a similar picture.

In an example, Step 104 includes Step A.

In Step A, the search result information is displayed in a superimposed manner on a local region of the user interface.

In the example, the local region is any one of a bottom region, a top region, a left frame region, a right frame region, an adjacent region of the target picture and an adjacent region of an operating coordinate of the selection operation. The local region is a part in the whole display region of a display screen, and is usually a region which does not cover the target picture in the whole display region, and a position of the local region displaying the search result information may be determined according to a position of the picture. Optionally, the display screen includes a primary screen and a secondary screen, and then the local region is a region where the secondary screen is located.

Figure 2:
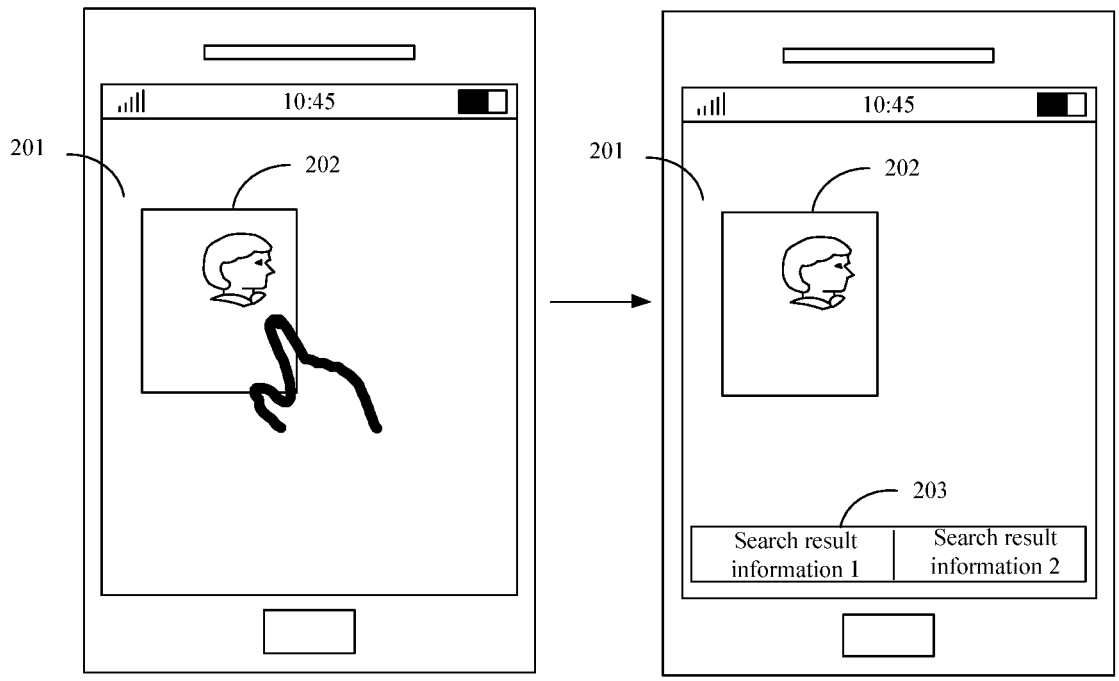
FIG. 2 is a schematic diagram illustrating an interface, according to an example.

For example, if the local region is the bottom region, with reference to FIG. 2, the target picture 202 in which the user is interested exists in the user interface 201, when the user performs a long press on the target picture 202, the terminal displays n pieces of search result information 203 in the bottom region, and the bottom region is a region adjacent to a bottom edge of a display region. Since there may be multiple pieces of search result information 203, under a limit of a size of the display region, the terminal may display only a part of the search result information 203, for example, only displays search result information 1 and search result information 2.

Figure 3:
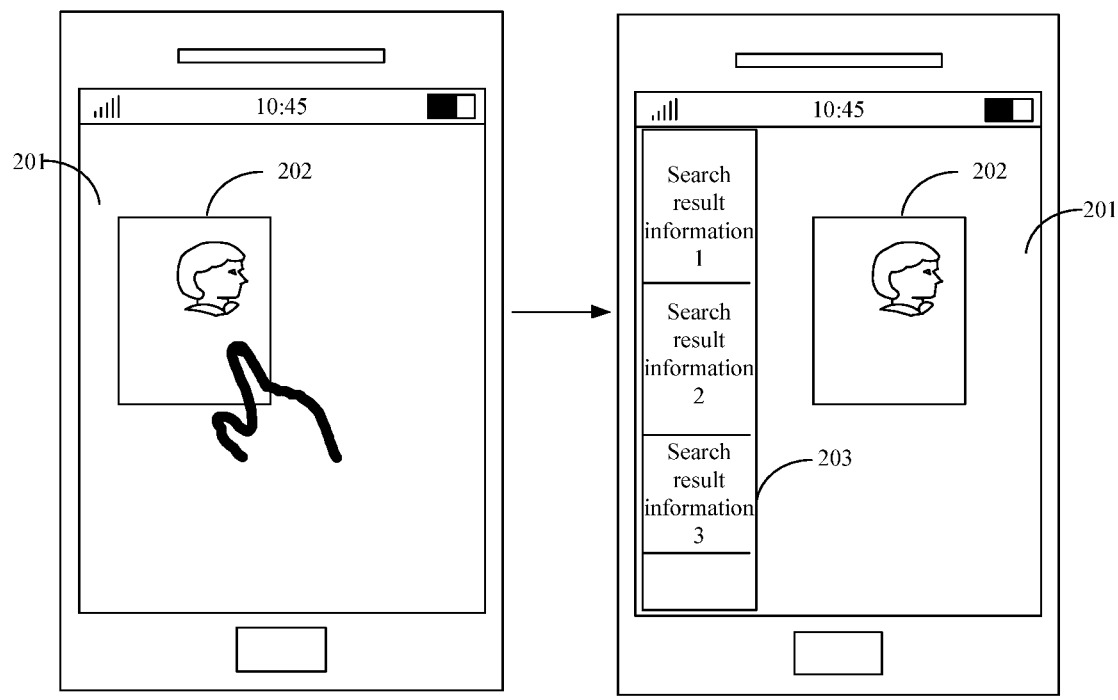
FIG. 3 is a schematic diagram illustrating an interface, according to an example.

For example, if the local region is the left frame region, with reference to FIG. 3, the target picture 202 in which the user is interested exists in the user interface 201, and the target picture 202 is a text or a picture. When the user performs a long press on the target picture 202, the terminal displays n pieces of search result information 203 in the left frame region, and the left frame region is a region adjacent to a left edge of the display region. Since there may be multiple pieces of search result information 203, under the limit of the size of the display region, the terminal may display only a part of the search result information 203, for example, only displays the search result information 1, the search result information 2 and search result information 3.

Figure 4:
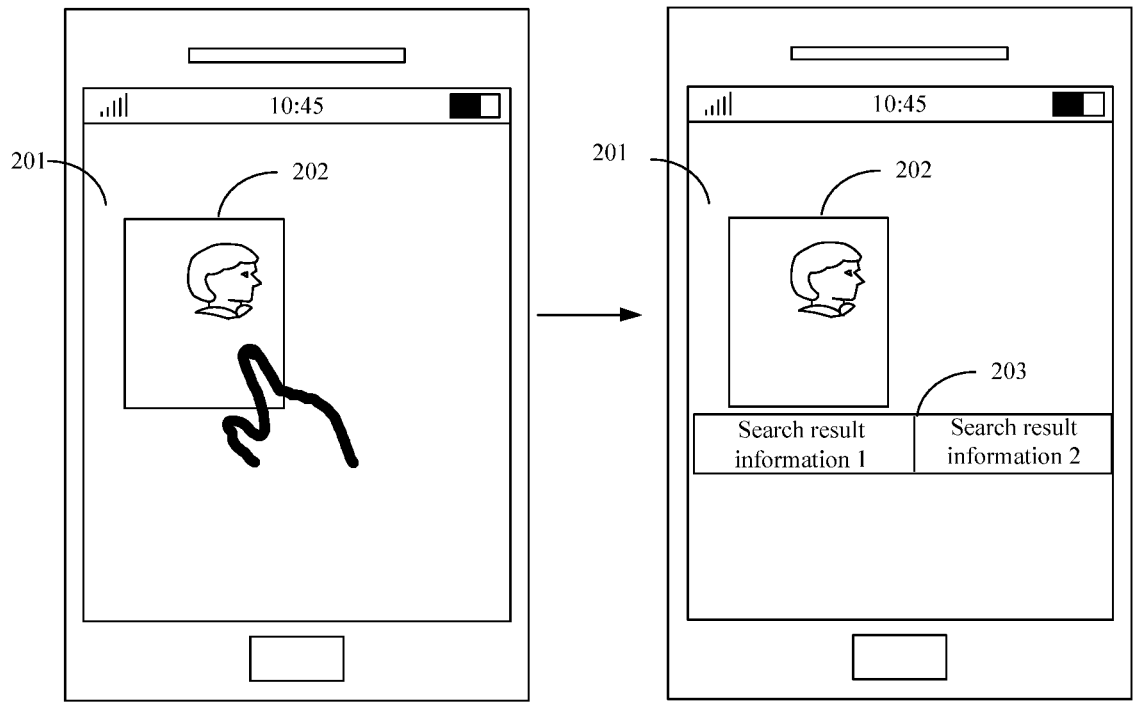
FIG. 4 is a schematic diagram illustrating an interface, according to an example.

For example, if the local region is the adjacent region of the target picture, with reference to FIG. 4, the target picture 202 in which the user is interested exists in the user interface 201, and the target picture 202 is a text or a picture. When the user performs a long press on the target picture 202, the terminal displays n pieces of search result information 203 in the left frame region, and the adjacent region is a region adjacent to an edge of the target picture. Since there may be multiple pieces of search result information 203, under the limit of the size of the display region, the terminal may display only a part of the search result information 203, for example, only displays the search result information 1 and the search result information 2.

From the above, according to the information display method provided by the example, after receiving the selection operation, the terminal may directly display in a superimposed manner the n pieces of search result information on the local region of the user interface through the operating system, and from the user perspective, the search result information of the target picture may be obtained through the selection operation, so that an operating frequency of the user in a search process is reduced, and the efficiency for human-computer interaction between the user and the terminal is improved.

In addition, the n pieces of search result information may be added through the search program in the operating system. When the n pieces of search result information are added through the search program in the operating system, no matter whether the application program is a native application program provided by the operating system or a third-party application program installed by the user, the information display method provided by the example may be implemented, that is, a global search capability in the terminal is provided for the user, so that an application range of the information display method is widened.

In addition, the n pieces of search result information are from different application programs and/or different websites, so that the operating system exhibits high-quality contents of the different application programs and/or the different websites in series within the local region of the application program, and the user is not required to continue switching and transferring between multiple application programs.

The user may slide display elements in the local region, each display element may be configured to display a piece of search result information. Such a slide operation includes: a first slide operation sliding along a first direction, and/or, a second slide operation sliding along a second direction. The first direction is opposite to the second direction.

When a display manner shown in FIG. 2 is adopted for the display elements, the first slide operation is a sliding operation from left to right, and the second slide operation is a sliding operation from right to left. The terminal slides and displays the display elements in the local region according to the slide operations.

For example, the terminal receives a first slide operation triggered on an ith display element, the first slide operation may be a sliding operation along the first direction, and the terminal slides the ith display element along the first direction according to the slide operation, hides a part of the ith display element slid out of the display screen, slides an (i-1)th display element along the first direction, and displays a part of the (i-1)th display element slid in the display screen.

Figure 5:
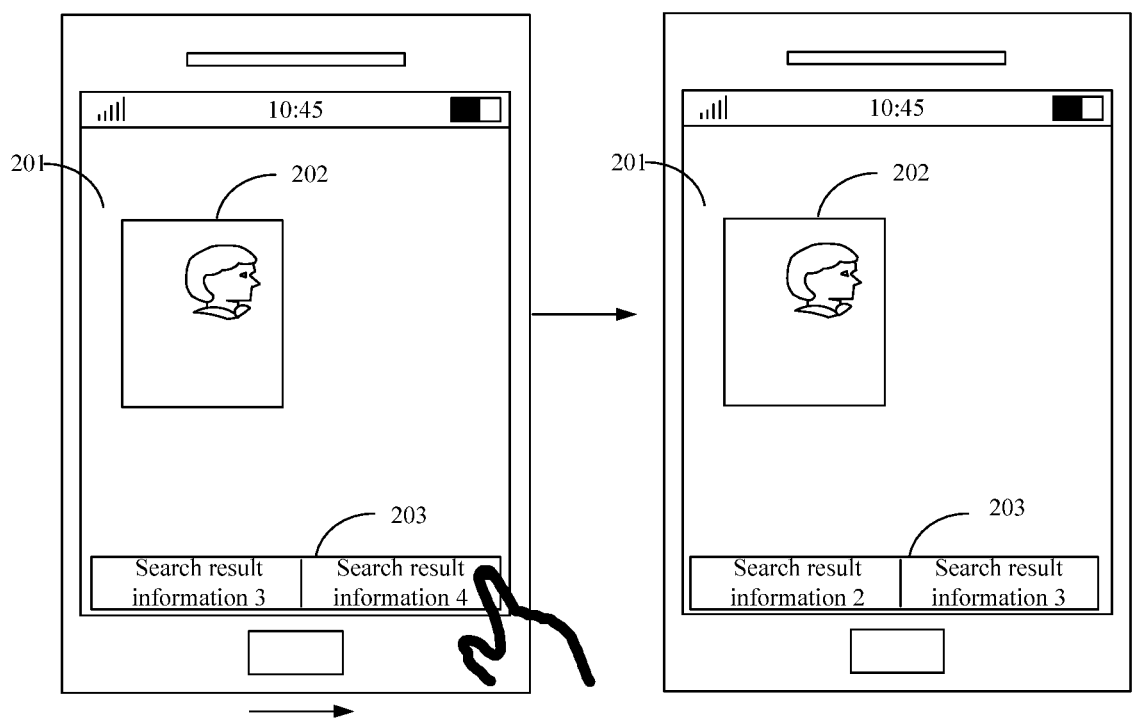
FIG. 5 is a schematic diagram illustrating an interface, according to an example.

Referring to FIG. 5, the terminal receives a rightward slide operation over a third display element 501, and the terminal slides the third display element 501 in the local region along a rightward direction according to the rightward slide operation, hides a part slid out of the display region of the display screen, slides a second display element 502 in the local region along the rightward direction, and displays the second display element 502 slid in the display region of the display screen.

For another example, the terminal receives a second slide operation triggered on the ith display element, the second slide operation may be a sliding operation along the second direction. The terminal slides the ith display element along the second direction according to the slide operation, hides a part of the ith display element slid out of the display screen, slides an (i+1)th display element along the second direction, and displays a part of the (i+1)th display element slid in the display screen.

Figure 6:
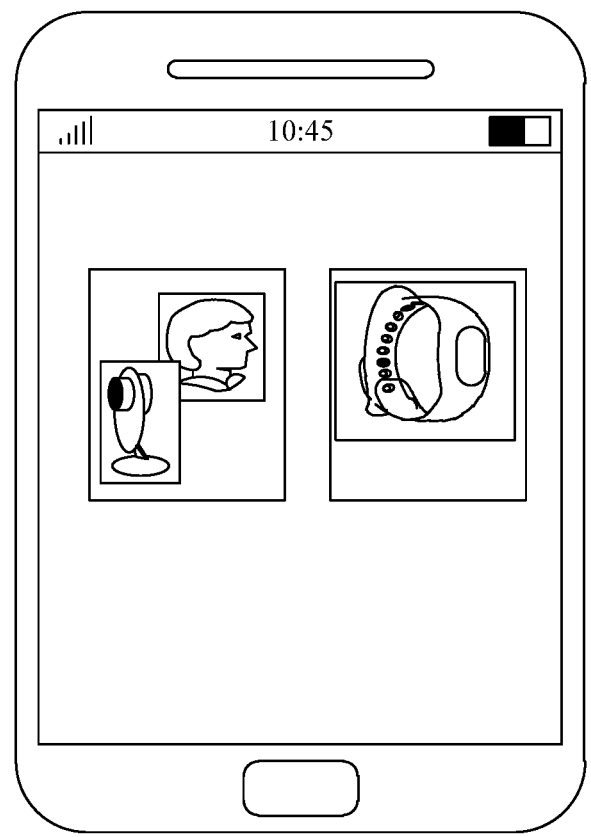
FIG. 6 is a schematic diagram illustrating an interface, according to an example.

Referring to FIG. 6, the terminal receives a leftward slide operation over a sixth display element 503, and the terminal slides the sixth display element 503 in the local region along a leftward direction according to the leftward slide operation, hides a part (a fifth display element) slid out of the display region of the display screen, slides a seventh display element 504 in the local region along the leftward direction, and displays a part (the seventh display element 504) slid in the display region of the display screen.

In the example, the content of the target picture may also be identified. At first, the whole content of the target picture is identified, the picture is matched with another picture in the local server or a network, and if a matching degree exceeds a preset similarity threshold value, the content of the target picture is determined to be a whole, wherein the picture can be matched with a picture such as a book cover and a movie/teleplay still in the local server or the network. If the matching degree does not exceed the preset similarity threshold value, the content of the target picture is determined not to be a whole, and details in the target picture may be identified. During detail identification, characteristics of a color, texture and the like of the target picture may be matched with characteristics in a preset characteristic library, and in case of successful matching, it may determine whether a detailed content in the target picture is a character or an article, and also may determine a character attribute (such as, a character name and the like) and an article attribute (such as, an article name and the like). After the character attribute and the article attribute are determined, the character attribute and the article attribute may be used as keywords, and the search result information is acquired by virtue of the keywords.

It also may determine whether there is any text in the target picture by adopting a text identification technology, and if there is a text, the text is determined as a keyword, and the search result information is acquired by virtue of the keyword, wherein word segmentation may be performed on the text to obtain multiple keywords.

A process of identifying the target picture may be implemented by the terminal, and may also be implemented by a server, referring to the following examples.

In an example, Step 103 includes Step B1 and Step B2.

Step B1: identifying the content of the target picture.

Step B2: acquiring the search result information corresponding to the content of the target picture through a local search program.

In the example, the terminal identifies the content of the picture and searches the search result information corresponding to the content of the target picture. The operating system in the mobile terminal may keep running the triggering service in the search program, and the trigger service keeps monitoring whether there is a selection operation for the pictures or not. If the selection operation is captured, equivalently, the selection operation triggered on the user interface is received, an identification service in the search program is triggered, and the identification service identifies the content of the picture. Then, the acquisition service in the search program is triggered, the acquisition service acquires the search result information corresponding to the content of the target picture, and the display service displays the search result information.

In an example, Step B2 includes Step B21.

Step B21: acquiring the search result information corresponding to the content of the target picture in one of local applications or the Internet through the local search program.

In the example, the search program may perform searching in one of the local applications, and may also include a search engine function for searching in the Internet. The search program is an operating-system-based program, and may perform searching in each application supported by the operating system. In addition, the search program may directly access the Internet and search each website of the Internet.

In other case, in an example, Step 103 includes: Step B1, Step B3 and Step B4.

Step B1: identifying the content of the target picture.

Step B3: sending a search request containing identified content information of the target picture to a server for instructing the server to search the search result information corresponding to the content of the target picture.

Step B4: receiving the search result information returned by the server.

In the example, the terminal identifies the content of the target picture, and the server searches the search result information corresponding to the content of the target picture, and feeds back the search result information to the terminal.

For example, an application program running in foreground on the terminal is of a merchant comment type, and a user interface running in foreground is an introduction page of delicious food "Beijing duck" provided by a shop X. When the user performs a long press on a target picture "Beijing duck is one of traditional delicacies in Beijing, and the Beijing duck of the merchant X is crispy in skin, tender in meat, fat but not greasy", the terminal sends a text content of the provided target picture to the server, and the server feeds back four pieces of search result information: an encyclopedia introduction about Beijing duck, a shop introduction about the merchant X, navigation information about the merchant X and online shopping information about the Beijing duck of the merchant X; and then, the terminal displays the four pieces of search result information with four display elements respectively. Under a limit of a width of the display screen, the terminal may simultaneously display two search results, and the user may slide and view each piece of search result information by virtue of a slide operation.

In an example, Step 103 includes Step B5 and Step B6.

Step B5: sending a search request containing picture data of the target picture to the server for instructing the server to identify the content of the target picture and search information associated with the content of the target picture.

Step B6: receiving the search result information returned by the server.

In the example, the picture data refers to a pixel value and the like of the picture. The content of the picture may reflect a practical meaning of the picture, for example, the picture includes a certain character or a certain article.

In the example, the server identifies the content of the picture, searches the information associated with the content of the target picture, and feeds back the search result information to the terminal.

In the example, the server may search a personal cloud disk of the user, for example, the personal cloud disk stores a phonebook, an album and the like of the user. The server may search the personal cloud disk for the contact information of the friend and the other photos of the friend. The server may also search the Internet such as an e-commerce platform, a movie/teleplay comment platform and an encyclopedia platform for the search result information corresponding to the content of the target picture.

In the example implemented by Step B1 and Step B2, the terminal implements identification and searching of the picture. In the example implemented by Step B1, Step B3 and Step B4, the terminal implements identification of the picture, and the server implements searching of the content of the picture. In the example implemented by Step B5 and Step B6, the server implements identification and searching of the picture. The identification and searching process may be implemented by an execution subject, and may also be implemented by multiple execution subjects.

In an example, the method further includes: Step C1 and Step C2

Step C1: determining a content type of the target picture according to the content of the target picture.

Step C2: determining a search target according to the content type.

Step 103 includes: Step C3.

Step C3: searching the search target according to the content of the target picture to acquire the search result information corresponding to the content of the target picture.

In the example, multiple content types and a corresponding relationship between the content types and search targets may be preset. The content type of the content of the target picture is determined, and the search target may be determined according to the content type. The search range may be narrowed through the search target. The search target is searched according to the content of the target picture to acquire the search result information corresponding to the content of the target picture, so that the search result information is more accurate, and is more consistent with a requirement of the user.

For example, the content type includes: a character type, and the corresponding search target includes at least one of: a friend photo in one of the local applications, friend contact information in one of the local applications, social account information of a public character in the Internet, news information of the public character in the Internet or resume information of the public character in the Internet;

the content type includes: a place type, and the corresponding search target includes at least one of: description information of a place, navigation information of the place on one of the local applications or a network, or map previewing information of the place on one of the local applications or the network;

the content type includes: an article type, and the corresponding search target includes at least one of: article description information, detail page information of an e-commerce platform, or comment information on an article; and the content type includes: a work cover type, and the corresponding search target includes at least one of: work description information, detail page information of an e-commerce platform, or comment information on a work.

The search target may be the preset e-commerce platform, encyclopedia platform, movie/teleplay platform, one of the local applications and the like. Therefore, the search range may further be narrowed.

In an example, the method further includes: Step D1.

Step D1: acquiring an application context of the application where the target picture is located, the application context including an identifier of the application and/or an identifier of the user interface.

Step C2 includes: Step D2.

Step D2: determining the search target according to the content type and the application context.

In the example, the application context may include an application type, an application identifier, description information of a page where the picture is located and the like.

In the example, a relationship between each application and a search target may be preconfigured, or a relationship between applications of each type and a search target is configured, or a relationship between pages of each type of each application and a search target is configured. Each content type may also be combined with an application context of each type to configure a relationship between the content type as well as the application context and the search target.

When the content type is the character type and the application context includes at least one of a phonebook application context or an album application context, the search target corresponding to the content type and the application context includes at least one of: the friend photo in one of the local applications or the friend contact information in one of the local applications.

For example, if the user browses a photo in the album application and the photo is a character picture of a friend, the content type is the character type and the application context includes the album application and a photo display page. The character type is combined with the album application, and the corresponding search target includes contact information of the friend and other photos of the friend. The contact information of the friend is searched in a local phonebook or a phonebook of the personal cloud disk according to the character picture of the friend, and the other photos of the friend is searched in the local album application or an album of the personal cloud disk.

When the content type is the character type and the application context includes a news application context, the search target corresponding to the content type and the application context may include at least one of: the social account information of the public character in the Internet, the news information of the public character in the Internet or the resume information of the public character in the Internet.

For another example, if the user is browsing news in the news application and there is a picture of the public character in the news, the content type is the character type and the application context includes the news application and a news detail page. The character type is combined with the news application, and the corresponding search target includes the resume, recent news and the like of the public character. The encyclopedia platform is searched for the resume of the public character according to the picture of the public character, and multiple preset news platforms are searched for the recent news (such as other news) of the public character.

In the example, the application context is combined with the content of the picture, so that the search target is determined more accurately, the search range may further be narrowed, thereby enabling the search result information to be more accurate and search efficiency to be higher.

In an example, the content of the target picture includes objects. The objects may be identified from the target picture by the terminal or the server, referring to Step B1 and Step B5.

Step C1 includes: Step E1.

Step E1: determining the content type of the target picture according to the objects.

Step 103 includes: Step E2.

Step E2: acquiring search result information corresponding to the objects.

In the example, the content of the picture is subdivided and identified, for example, it is identified that the picture includes at least two types of objects, i.e. a character (object) and an article (object). When the two types of objects are identified, there are multiple implementation manners for determining the corresponding content type, referring to the following manner 1 and manner 2. In the manner 1, content types are determined according to the objects of each type respectively. For example, the content types are determined according to the character and the article respectively. There are two corresponding content types, i.e. the character type and the article type. Character news of the Internet is searched for a resume, contact information, other photos, other news and the like of a character according to the character type, and the e-commerce platform of the Internet is searched for description information of the article, price information of the article, a detail page of the e-commerce platform for the article and the like according to the article type, wherein a corresponding relationship between an object of each type and a content type is preconfigured, and the objects form a one-to-one corresponding relationship or one-to-many relationship with the content types. In the manner 2, a content type is determined cooperatively according to objects of more than two types. For example, the content type, such as the article type, is determined cooperatively according to the character and the article. The e-commerce platform of the Internet is searched for the article endorsed by the character according to the article type, wherein a corresponding relationship between objects of multiple types and content types is preconfigured, and the objects form a many-to-one relationship or a many-to-many relationship with the content types.

In the example, objects obtained by subdivision of the picture include a text, a character, an article and the like. If the picture includes multiple characters, multiple articles or the like, each character or each article is an object. If there are relatively more objects (for example, more than 3) in the picture, or the objects are incompletely displayed and covered by other objects, main objects dominate, for example, the main objects are objects of no more than 3 which have the largest areas and are completely displayed.

The example may also be combined with Step D1 and Step D2, that is, the application context is combined with the object to determine the search target together. For example, the album application is combined with the character, and the determined search target is the contact information of the friend and the other photos of the friend. The news application is combined with the character, and the determined search target is the resume, recent news and the like of the public character.

When the picture includes multiple objects, the content types may be determined by adopting the manner 1 respectively, that is, one picture may correspond to multiple content types; and the content type may also be determined cooperatively by adopting the manner 2. One or more objects may also be selected by the user. In an example, the method further includes: Step F1-Step F3.

Step F1: displaying objects included in the content of the target picture, a number of the objects may be more than one.

Each image in each picture in the region indicated by the selection operation is highlighted. No matter whether the region includes one or more pictures, the region may include multiple objects, and each object may be highlighted. The example is also applied to highlight the display of the picture.

Step F2: receiving a selection operation for the objects to select a target object from the more than one object.

Step F3: acquiring search result information corresponding to the target object.

In the example, the region indicated by the selection operation may be a picture region, and may also be a region in a preset range around the picture region and the picture. The region in the preset range may include at least two pictures. If the at least two pictures are included, each picture is highlighted for display as an independent target for the user to select. The picture may include at least two objects, and if the at least two objects are included, each object is highlighted for display as an independent target for the user to select, as shown in FIG. 6.

There are multiple manners for the highlighted display, such as framing, increasing brightness, increasing chromaticity and the like.

Figure 7:
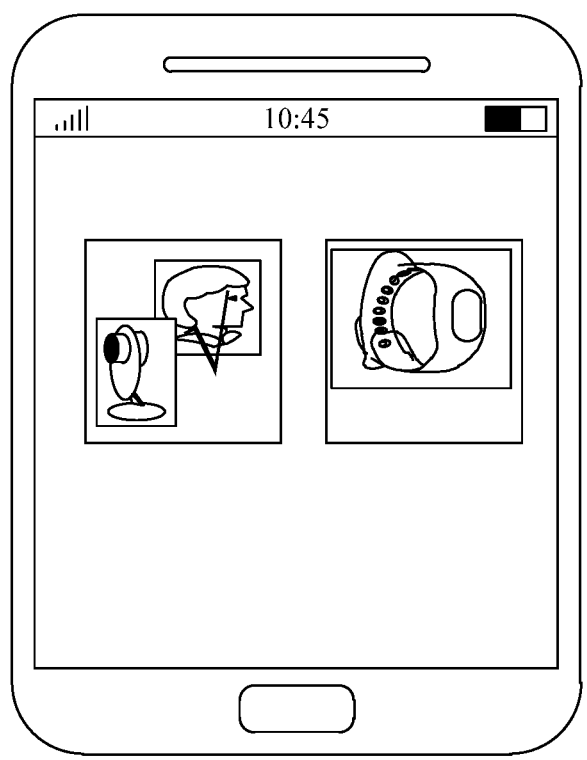
FIG. 7 is a schematic diagram illustrating an interface, according to an example.

The user may perform a click operation (i.e. another selection operation) on one or more targets (including pictures and objects). Equivalently, another selection operation for the pictures or the objects is received, as shown in FIG. 7.

Figure 8:
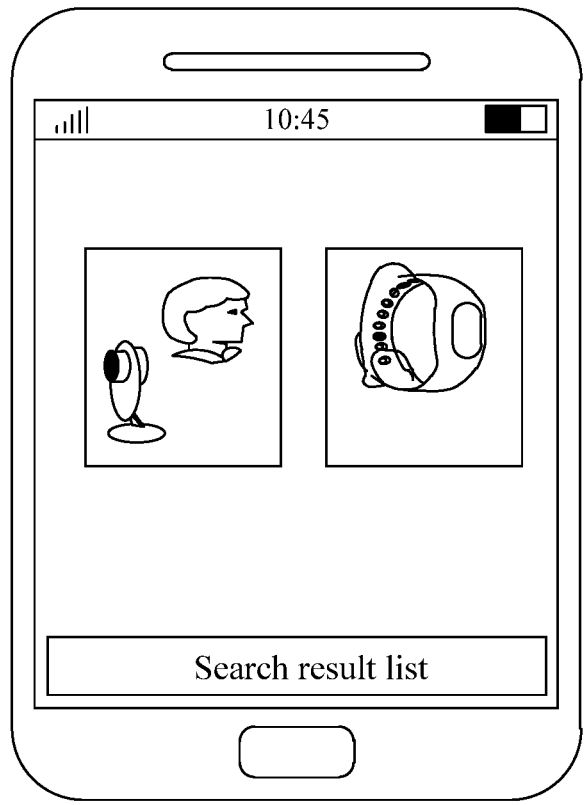
FIG. 8 is a schematic diagram illustrating an interface, according to an example.

The corresponding search result information is acquired according to the picture or object selected by the user. The search result information is displayed, as shown in FIG. 8. According to the example, the search range may be narrowed, and the search result information is more consistent with the requirement of the user.

In an example, Step 103 includes: Step G.

Step G: acquiring search result information corresponding to the whole content of the target picture.

In the example, it may determine whether the content of the target picture is a whole or not, and if it is a whole, for example, a book cover or a still of a movie/teleplay work, the search is performed according to the whole content to acquire the search result information.

In an example, the method further includes: Step H1.

Step H1: determining a region indicated by the selection operation.

Step 103 includes: Step H2.

Step H2: when the region indicated by the selection operation includes a partial content of the target picture, acquiring search result information corresponding to the partial content of the target picture.

In the example, the region indicated by the selection operation may be determined. For example, the selection operation is a circling operation implemented by a slide gesture, and a circling range is the region. In other case, the selection operation may be a click operation, a frame in a preset shape, such as a rectangular frame, with a preset size or an adjustable size is displayed centered on a clicking position, and a range limited by the frame in the preset shape is the region. Of course, it is not limited to the rectangular frame, and may also be in another shape. The user may adjust the size of the rectangular frame, and an adjusted range is the region. When the region only includes the partial content of the target picture, the search result information corresponding to the partial content of the target picture is acquired.

For example, the target picture is a painting, and there is an apple and an orange at a lower half part of the target picture. The region indicated by the selection operation is the lower half part of the picture, and then the region includes the apple and the orange. Search result information corresponding to the apple and the orange is acquired, such as an entry of an e-commerce platform selling the apple and the orange.

An implementation process will be introduced below in detail through some examples.

Figure 9:
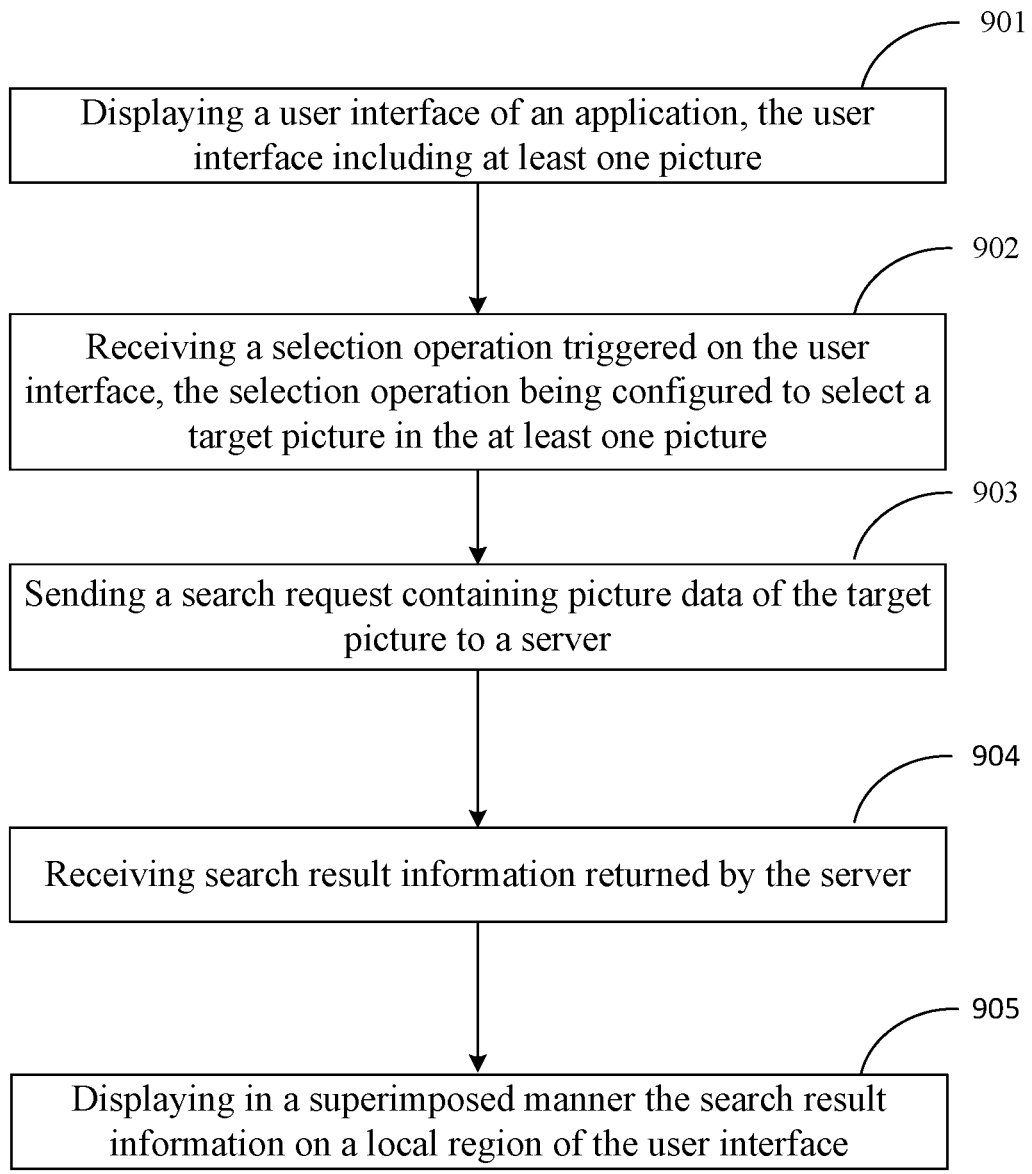
FIG. 9 is a flow chart showing an information display method, according to an example.

FIG. 9 is a flow chart showing an information display method, according to an example. As shown in FIG. 9, the method may be implemented by equipment such as a mobile terminal, and includes the following steps.

Step 901: displaying a user interface of an application, the user interface including at least one picture.

Step 902: receiving a selection operation triggered on the user interface, and the selection operation may be configured to select a target picture in the at least one picture.

Step 903: sending a search request containing picture data of the target picture to a server for instructing the server to identify a content of the target picture and search information associated with the content of the target picture.

Step 904: receiving search result information returned by the server.

Step 905: displaying in a superimposed manner the search result information on a local region of the user interface.

According to the example, the terminal may display the user interface and receive the selection operation. The server implements identification and searching of the target picture. The terminal receives and displays the search result information to a user. Detailed descriptions will be made below with the implementation by the terminal as an example.

Figure 10:
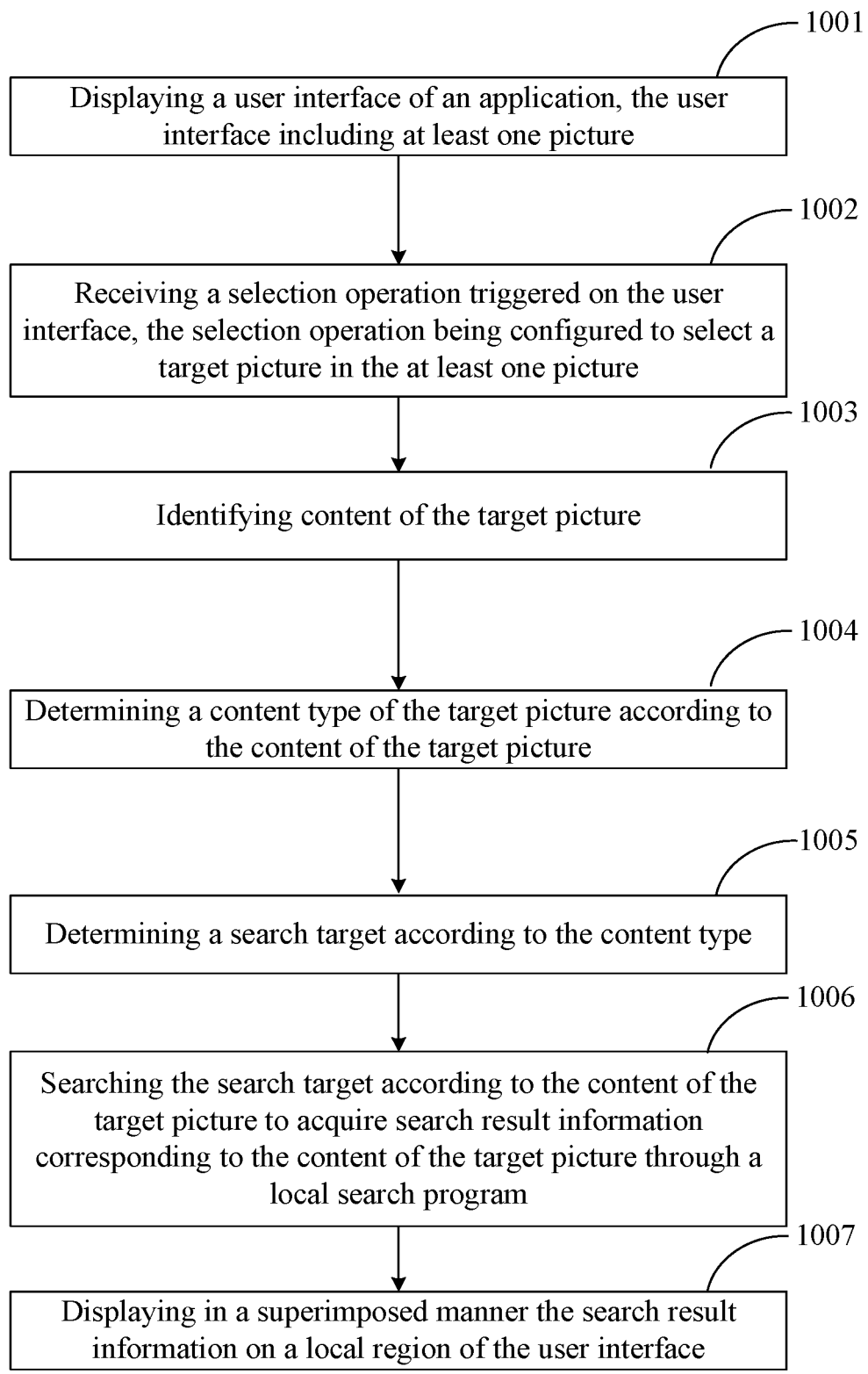
FIG. 10 is a flow chart showing an information display method, according to an example.

FIG. 10 is a flow chart showing an information display method, according to an example. As shown in FIG. 10, the method may be implemented by equipment such as a mobile terminal, and includes the following steps.

Step 1001: displaying a user interface of an application, the user interface including at least one picture.

Step 1002: receiving a selection operation triggered on the user interface, and the selection operation may be configured to select a target picture in the at least one picture.

Step 1003: identifying content of the target picture.

Step 1003 may also be implemented by a server. The mobile terminal sends picture data of the target picture to the server, and the server identifies the content of the target picture according to the picture data of the target picture.

Step 1004: determining a content type of the target picture according to the content of the target picture.

The step may also be implemented by the server. After the server identifies the content of the target picture according to the picture data of the target picture, the server may determine the content type of the target picture according to the content of the target picture.

Step 1005: determining a search target according to the content type.

The step may also be implemented by the server. After determining the content type, the server may determine the search target according to the content type.

Step 1006: searching the search target according to the content of the target picture to acquire search result information corresponding to the content of the target picture through a local search program.

The step may also be implemented by the server. The server may search the Internet or a personal cloud disk of a user for the search target to acquire the search result information corresponding to the content of the target picture, and feed back the search result information to the mobile terminal.

Step 1007: displaying in a superimposed manner the search result information on a local region of the user interface.

According to the example, the terminal implements a process of identifying and searching the content of the target picture. Moreover, the terminal may further determine the content type and the search target to narrow a search range and acquire more accurate search result information. Of course, the content type and the search target may also be determined by the server.

Figure 11:
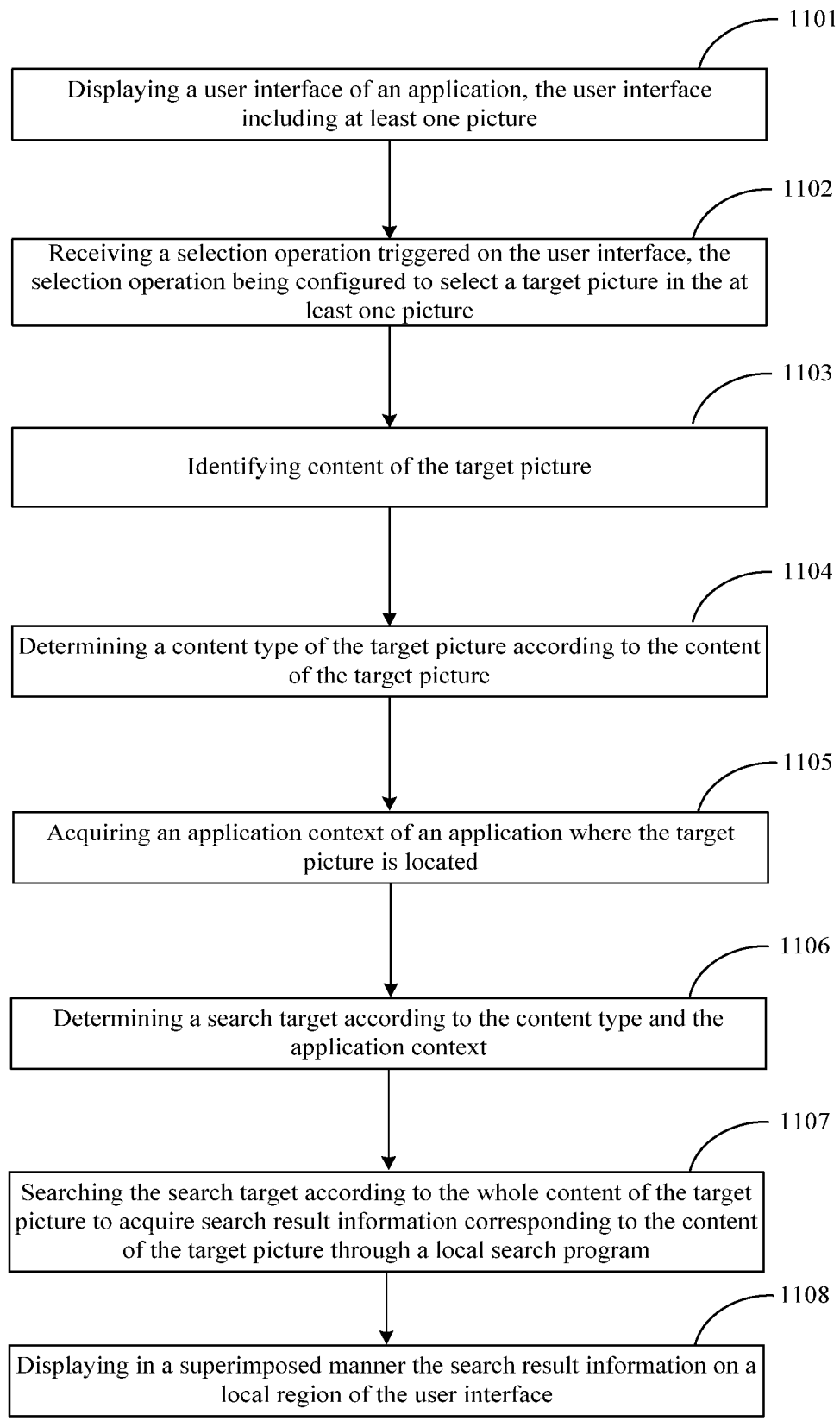
FIG. 11 is a flow chart showing an information display method, according to an example.

FIG. 11 is a flow chart showing an information display method, according to an example. As shown in FIG. 11, the method may be implemented by equipment such as a mobile terminal, and includes the following steps.

Step 1101: displaying a user interface of an application, the user interface including at least one picture.

Step 1102: receiving a selection operation triggered on the user interface, and the selection operation may be configured to select a target picture in the at least one picture.

Step 1103: identifying content of the target picture.

Step 1104: determining a content type of the target picture according to the content of the target picture.

Step 1105: acquiring an application context of an application where the target picture is located, the application context including an identifier of the application and/or an identifier of the user interface.

Step 1106: determining a search target according to the content type and the application context.

Step 1107: searching the search target according to the whole content of the target picture to acquire search result information corresponding to the content of the target picture through a local search program.

Step 1108: displaying in a superimposed manner the search result information on a local region of the user interface.

According to the example, the content type is combined with the application context to determine the search target, and the search target is searched according to the whole content of the target picture to acquire the search result information, so that a result is more accurate, and search efficiency is higher.

Figure 12:
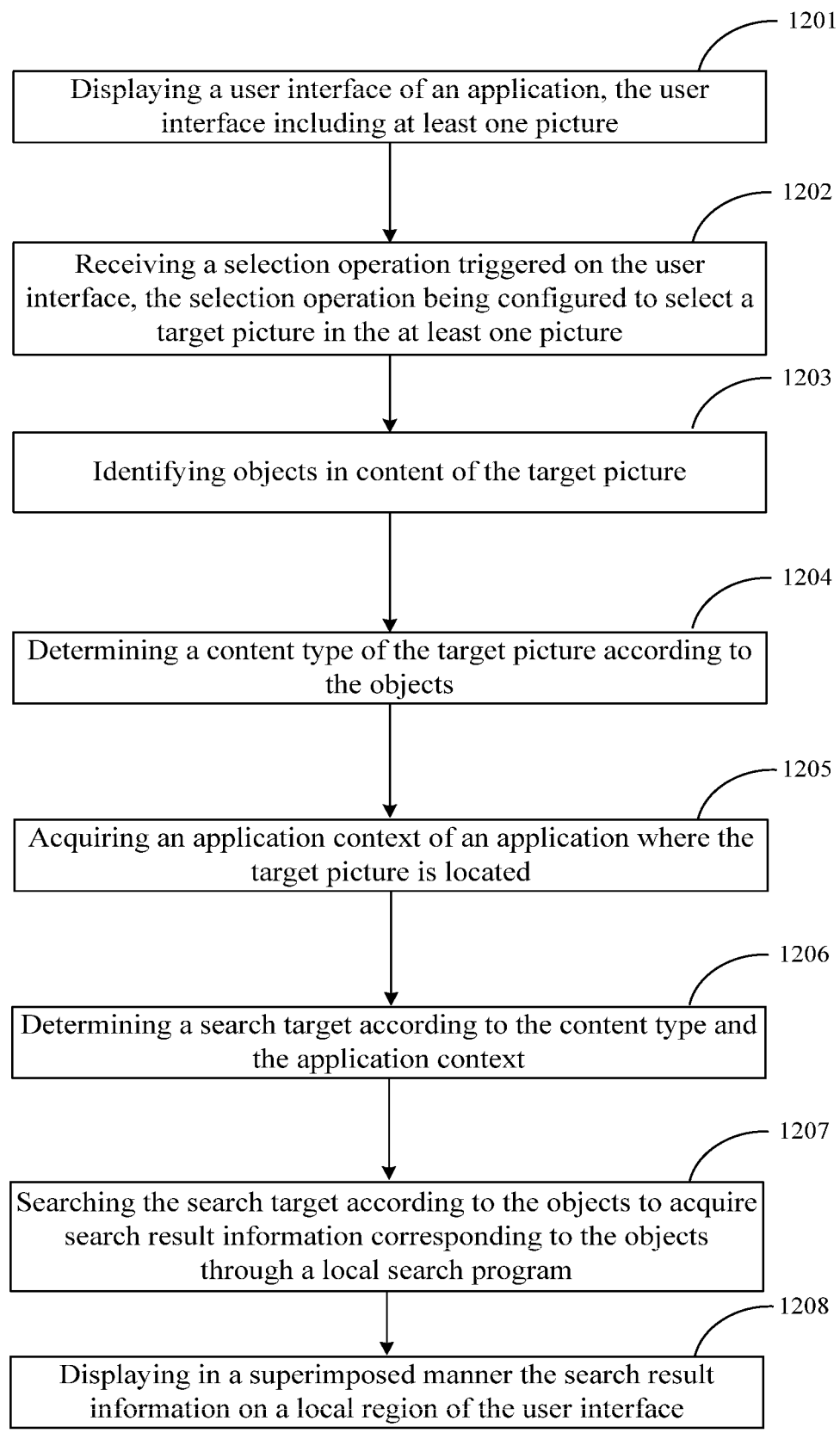
FIG. 12 is a flow chart showing an information display method, according to an example.

FIG. 12 is a flow chart showing an information display method, according to an example. As shown in FIG. 12, the method may be implemented by equipment such as a mobile terminal, and includes the following steps.

Step 1201: displaying a user interface of an application, the user interface including at least one picture.

Step 1202: receiving a selection operation triggered on the user interface, and the selection operation may be configured to select a target picture in the at least one picture.

Step 1203: identifying objects in content of the target picture.

Step 1204: determining a content type of the target picture according to the objects.

Step 1205: acquiring an application context of an application where the target picture is located, the application context including an identifier of the application and/or an identifier of the user interface.

Step 1206: determining a search target according to the content type and the application context.

Step 1207: searching the search target according to the objects to acquire search result information corresponding to the objects through a local search program.

Step 1208: displaying in a superimposed manner the search result information on a local region of the user interface.

According to the example, the content of the target picture is subdivided, and in units of the objects, the content type is determined and the search result information is acquired, so that the search accuracy is higher, and an accurate search requirement of a user is met.

The abovementioned examples may be freely combined according to practical requirements.

The implementation process for information display is understood from the above introduction, and the process is implemented by a mobile terminal and a computer. Internal structures and functions of the two pieces of equipment will be introduced below respectively.

Figure 13:
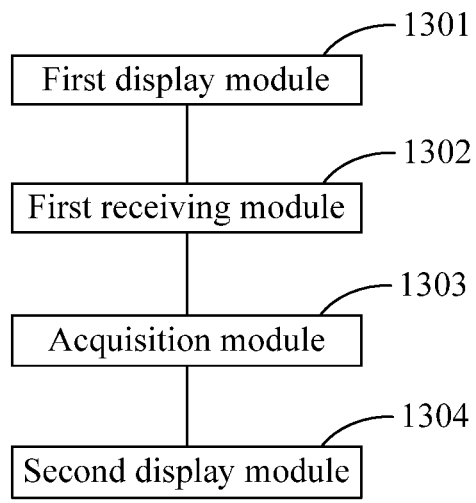
FIG. 13 is a block diagram of an information display device, according to an example.

FIG. 13 is a schematic diagram illustrating an information display device, according to an example. Referring to FIG. 13, the device includes: a first display module 1301, a first receiving module 1302, an acquisition module 1303 and a second display module 1304.

The first display module 1301 may be configured to display a user interface of an application, the user interface including at least one picture.

The first receiving module 1302 may be configured to receive a selection operation triggered on the user interface, and the selection operation may be configured to select a target picture in the at least one picture.

The acquisition module 1303 may be configured to acquire search result information corresponding to content of the target picture.

The second display module 1304 may be configured to display the search result information.

Figure 14:
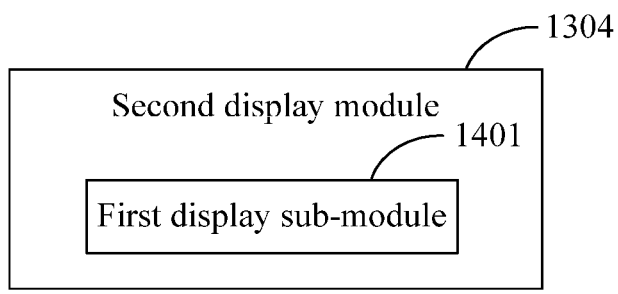
FIG. 14 is a block diagram of a second display module, according to an example.

In an example, as shown in FIG. 14, the second display module 1304 includes a first display sub-module 1401.

The first display sub-module 1401 may be configured to display in a superimposed manner the search result information on a local region of the user interface.

Figure 15:
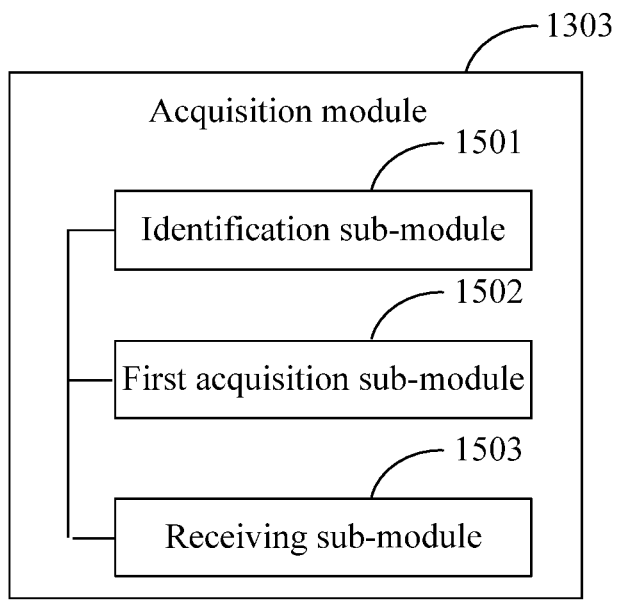
FIG. 15 is a block diagram of an acquisition module, according to an example.

In an example, as shown in FIG. 15, the acquisition module 1303 includes: an identification sub-module 1501, a first acquisition sub-module 1502 and a receiving sub-module 1503.

The identification sub-module 1501 may be configured to identify the content of the target picture.

The first acquisition sub-module 1502 may be configured to acquire the search result information corresponding to the content of the target picture through a local search program, or send a search request containing identified content information of the target picture to a server for instructing the server to search the search result information corresponding to the content of the target picture.

The receiving sub-module 1503 may be configured to receive the search result information returned by the server.

In an example, the first acquisition sub-module 1502 acquires the search result information corresponding to the content of the target picture in one of the local applications or the Internet through the local search program.

Figure 16:
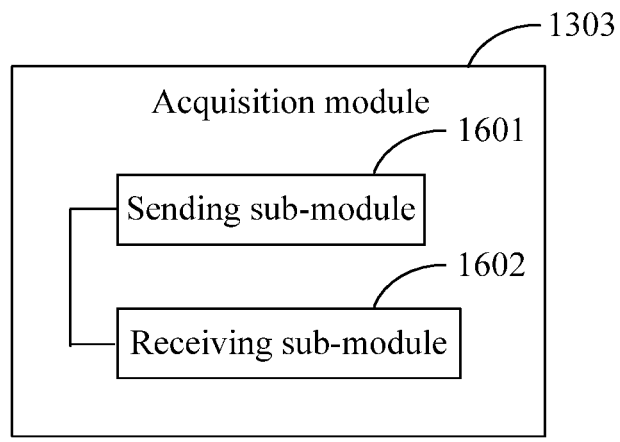
FIG. 16 is a block diagram of an acquisition module, according to an example.

In an example, as shown in FIG. 16, the acquisition module 1303 includes: a sending sub-module 1601 and a receiving sub-module 1602.

The sending sub-module 1601 may be configured to send a search request containing picture data of the target picture to the server for instructing the server to identify the content of the target picture and search information associated with the content of the target picture.

The receiving sub-module 1602 may be configured to receive the search result information returned by the server.

Figure 17:
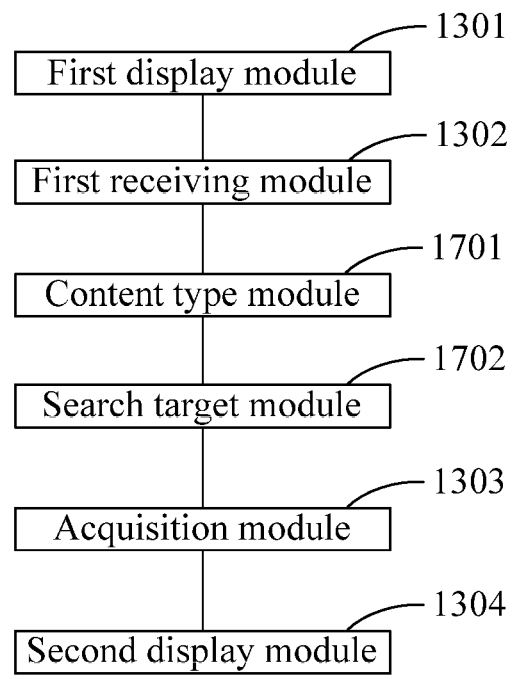
FIG. 17 is a block diagram of an information display device, according to an example.

In an example, as shown in FIG. 17, the device further includes: a content type module 1701 and a search target module 1702.

The content type module 1701 may be configured to determine a content type of the target picture according to the content of the target picture.

The search target module 1702 may be configured to determine a search target according to the content type.

Figure 18:
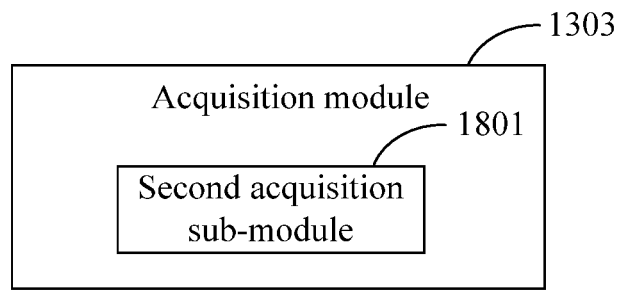
FIG. 18 is a block diagram of an acquisition module, according to an example.

As shown in FIG. 18, the acquisition module 1303 includes a second acquisition sub-module 1801.

The second acquisition sub-module 1801 may be configured to search the search target according to the content of the target picture to acquire the search result information corresponding to the content of the target picture.

Figure 19:
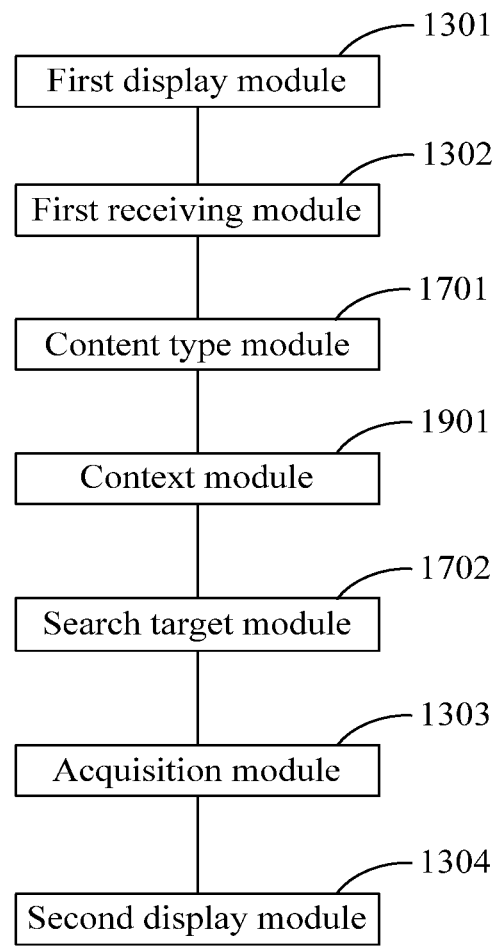
FIG. 19 is a block diagram of an information display device, according to an example.

In an example, as shown in FIG. 19, the device further includes a context module 1901.

The context module 1901 may be configured to acquire an application context of the application where the target picture is located, the application context including an identifier of the application and/or an identifier of the user interface.

Figure 20:
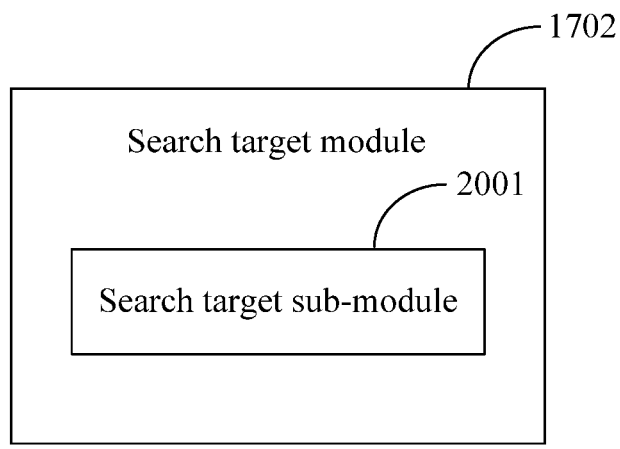
FIG. 20 is a block diagram of a search target module, according to an example.

As shown in FIG. 20, the search target module 1702 includes a search target sub-module 2001.

The search target sub-module 2001 may be configured to determine the search target according to the content type and the application context.

In an example, the content of the target picture includes objects.

Figure 21:
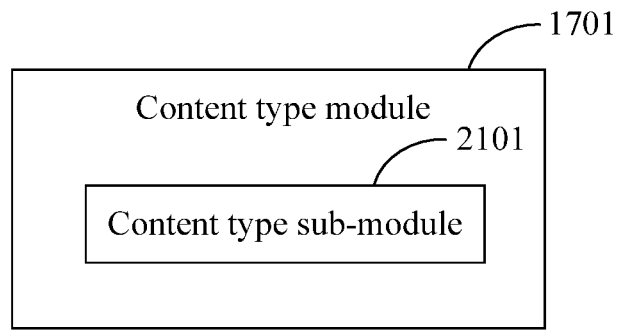
FIG. 21 is a block diagram of a content type module, according to an example.

As shown in FIG. 21, the content type module 1701 includes a content type sub-module 2101.

The content type sub-module 2101 may be configured to determine the content type of the target picture according to the objects.

Figure 22A:
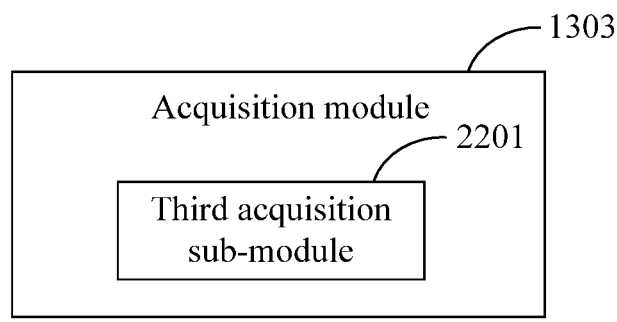
FIG. 22A is a block diagram of an acquisition module, according to an example.

As shown in FIG. 22A, the acquisition module 1303 includes a third acquisition sub-module 2201.

The third acquisition sub-module 2201 may be configured to acquire search result information corresponding to the objects.

Figure 22B:
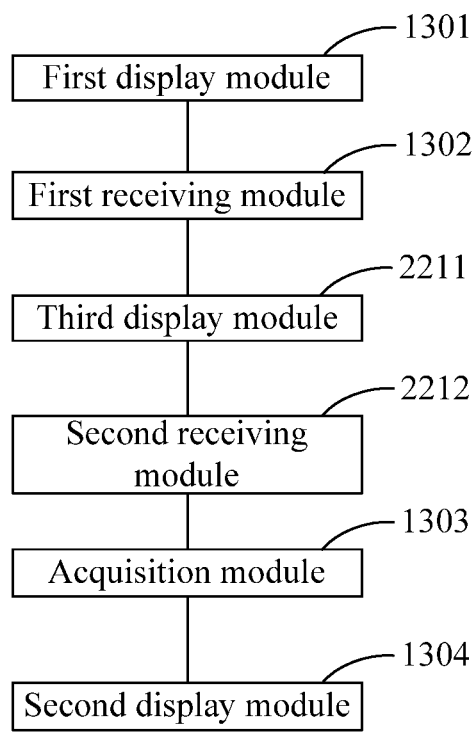
FIG. 22B is a block diagram of an information display device, according to an example.

In an example, as shown in FIG. 22B, the device further includes: a third display module 2211 and a second receiving module 2212.

The third display module 2211 may be configured to display objects included in the content of the target picture, a number of the objects is more than one.

The second receiving module 2212 may be configured to receive a selection operation for the objects to select a target object from the more than one object.

Figure 22C:
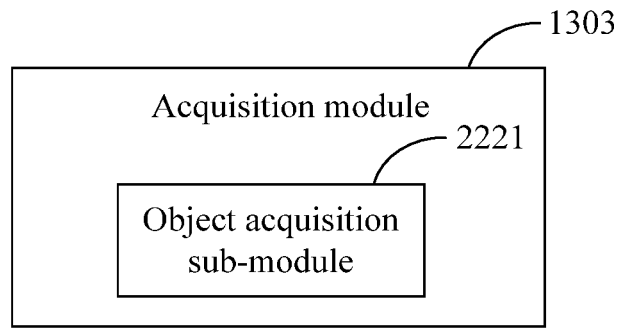
FIG. 22C is a block diagram of an acquisition module, according to an example.

As shown in FIG. 22C, the acquisition module 1303 includes an object acquisition sub-module 2221.

The object acquisition sub-module 2221 may be configured to acquire search result information corresponding to the target object.

Figure 23:
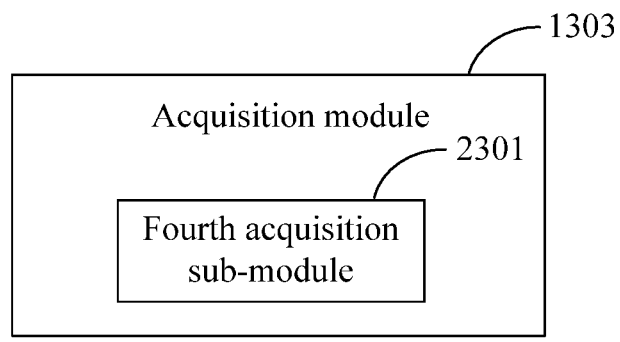
FIG. 23 is a block diagram of an acquisition module, according to an example.

In an example, as shown in FIG. 23, the acquisition module 1303 includes a fourth acquisition sub-module 2301.

The fourth acquisition sub-module 2301 may be configured to acquire search result information corresponding to the whole content of the target picture.

Figure 24:
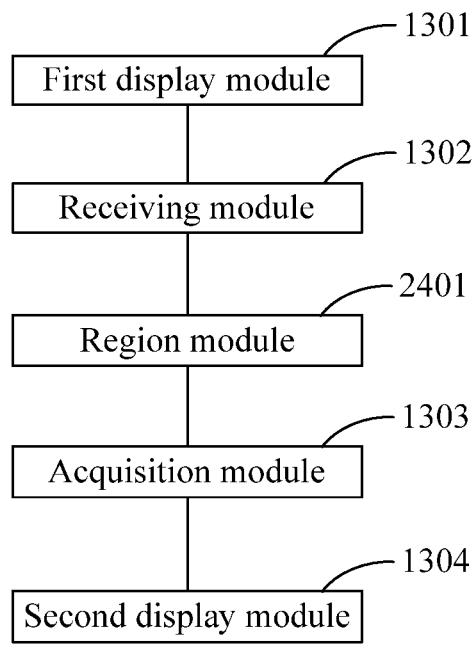
FIG. 24 is a block diagram of an information display device, according to an example.

In an example, as shown in FIG. 24, the device further includes a region module 2401.

The region module 2401 may be configured to determine a region indicated by the selection operation.

Figure 25:
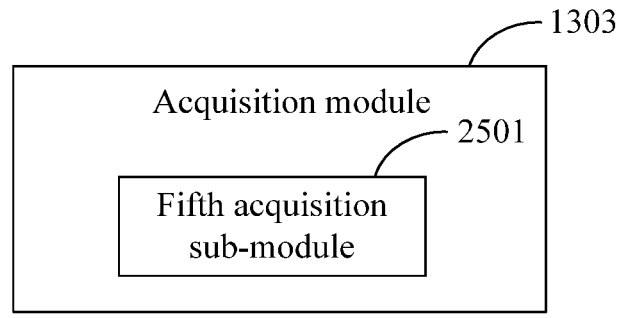
FIG. 25 is a block diagram of an acquisition module, according to an example.

As shown in FIG. 25, the acquisition module 1303 includes a fifth acquisition sub-module 2501.

The fifth acquisition sub-module 2501 may be configured to, when the region indicated by the selection operation includes a partial content of the target picture, acquire search result information corresponding to the partial content of the target picture.

In an example, the content type includes: a character type, and the corresponding search target includes at least one of: a friend photo in one of the local applications, friend contact information in one of the local applications, social account information of a public character in the Internet, news information of the public character in the Internet, or resume information of the public character in the Internet;

the content type includes: a place type, and the corresponding search target includes at least one of: description information of a place, navigation information of the place on one of the local applications or a network, or map previewing information of the place on one of the local applications or the network;

the content type includes: an article type, and the corresponding search target includes at least one of: article description information, detail page information of an e-commerce platform, or comment information on an article; and the content type includes: a work cover type, and the corresponding search target includes at least one of: work description information, detail page information of an e-commerce platform, or comment information on a work.

In an example, when the content type is the character type and the application context includes at least one of: a phonebook application context or an album application context, the search target corresponding to the content type and the application context includes at least one of: the friend photo in one of the local applications or the friend contact information in one of the local applications; and when the content type is the character type and the application context includes a news application context, the search target corresponding to the content type and the application context includes at least one of: the social account information of the public character in the Internet, the news information of the public character in the Internet or the resume information of the public character in the Internet.

With respect to the devices in the above example, the specific manners in which individual modules perform operations therein have been described in detail in the related examples of the methods, which will not be elaborated herein.

Figure 26:
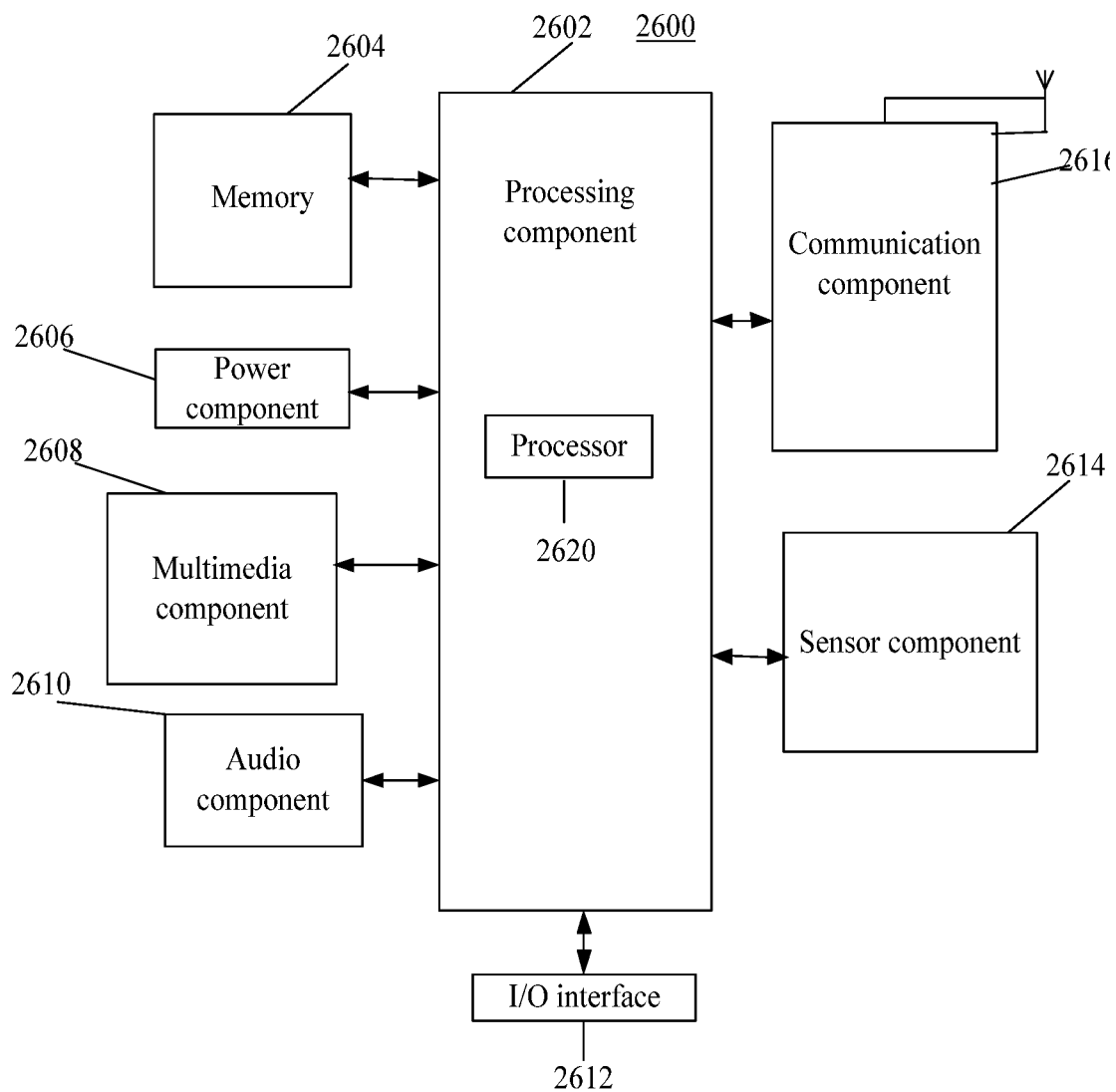
FIG. 26 is a block diagram of a device, according to an example.

FIG. 26 is a block diagram of an information display device 2600, according to an example. For example, the device 2600 may be a mobile phone, a computer, a digital broadcast terminal, a messaging device, a gaming console, a tablet, a medical device, exercise equipment, a personal digital assistant and the like.

Referring to FIG. 26, the device 2600 may include one or more of the following components: a processing component 2602, a memory 2604, a power component 2606, a multimedia component 2608, an audio component 2610, an Input/Output (I/O) interface 2612, a sensor component 2614, and a communication component 2616.

The processing component 2602 typically controls overall operations of the device 2600, such as the operations associated with display, telephone calls, data communications, camera operations, and recording operations. The processing component 2602 may include one or more processors 2620 to execute instructions to perform all or part of the steps in the abovementioned method. Moreover, the processing component 2602 may include one or more modules which facilitate interaction between the processing component 2602 and the other components. For instance, the processing component 2602 may include a multimedia module to facilitate interaction between the multimedia component 2608 and the processing component 2602.

The memory 2604 may be configured to store various types of data to support the operation of the device 2600. Examples of such data include instructions for any application programs or methods operated on the device 2600, contact data, phonebook data, messages, pictures, video, etc. The memory 2604 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 2606 provides power for various components of the device 2600. The power component 2606 may include a power management system, one or more power supplies, and other components associated with the generation, management and distribution of power for the device 2600.

The multimedia component 2608 includes a screen providing an output interface between the device 2600 and a user. In some examples, the screen may include a Liquid Crystal Display (LCD) and a Touch Panel (TP). If the screen includes the TP, the screen may be implemented as a touch screen to receive an input signal from the user. The TP includes one or more touch sensors to sense touches, slides and gestures on the TP. The touch sensors may not only sense a boundary of a touch or slide action, but also detect a duration and pressure associated with the touch or slide action. In some examples, the multimedia component 2608 includes a front camera and/or a rear camera. The front camera and/or the rear camera may receive external multimedia data when the device 2600 is in an operation mode, such as a photographing mode or a video mode. Each of the front camera and the rear camera may be a fixed optical lens system or have focusing and optical zooming capabilities.

The audio component 2610 may be configured to output and/or input an audio signal. For example, the audio component 2610 includes a Microphone (MIC), and the MIC may be configured to receive an external audio signal when the device 2600 is in the operation mode, such as a call mode, a recording mode and a voice recognition mode. The received audio signal may be further stored in the memory 2604 or sent through the communication component 2616. In some examples, the audio component 2610 further includes a speaker configured to output the audio signal.

The I/O interface 2612 provides an interface between the processing component 2602 and a peripheral interface module, and the peripheral interface module may be a keyboard, a click wheel, a button and the like. The button may include, but not limited to: a home button, a volume button, a starting button and a locking button.

The sensor component 2614 includes one or more sensors configured to provide status assessment in various aspects for the device 2600. For instance, the sensor component 2614 may detect an on/off status of the device 2600 and relative positioning of components, such as a display and small keyboard of the device 2600, and the sensor component 2614 may further detect a change in a position of the device 2600 or a component of the device 2600, presence or absence of contact between the user and the device 2600, orientation or acceleration/deceleration of the device 2600 and a change in temperature of the device 2600. The sensor component 2614 may include a proximity sensor configured to detect presence of an object nearby without any physical contact. The sensor component 2614 may also include a light sensor, such as a Complementary Metal Oxide Semiconductor (CMOS) or Charge Coupled Device (CCD) image sensor, configured for use in an imaging application. In some examples, the sensor component 2614 may also include an acceleration sensor, a gyroscope sensor, a magnetic sensor, a pressure sensor or a temperature sensor.

The communication component 2616 may be configured to facilitate wired or wireless communication between the device 2600 and other equpment. The device 2600 may access a communication-standard-based wireless network, such as a Wireless Fidelity (WiFi) network, a 2nd-Generation (2G) or 3rd-Generation (3G) network or a combination thereof. In an example, the communication component 2616 receives a broadcast signal or broadcast associated information from an external broadcast management system through a broadcast channel. In an example, the communication component 2616 further includes a Near Field Communcation (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a Bluetooth (BT) technology and another technology.

In an example, the device 2600 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and may be configured to execute the abovementioned method.

In an example, there is also provided a non-transitory computer-readable storage medium including an instruction, such as the memory 2604 including an instruction, and the instruction may be executed by the processor 2620 of the device 2600 to implement the abovementioned method. For example, the non-transitory computer-readable storage medium may be a ROM, a Random Access Memory (RAM), a Compact Disc Read-Only Memory (CD-ROM), a magnetic tape, a floppy disc, optical data storage equipment and the like.

An information display device includes:
a processor; and
a memory configured to store an instruction executable for the processor,
wherein the processor may be configured to implement the abovementioned information display method.

According to a non-transitory computer-readable storage medium, an instruction in the storage medium may be executed by a processor of a mobile terminal to enable the mobile terminal to execute the abovementioned information display method.

Figure 27:
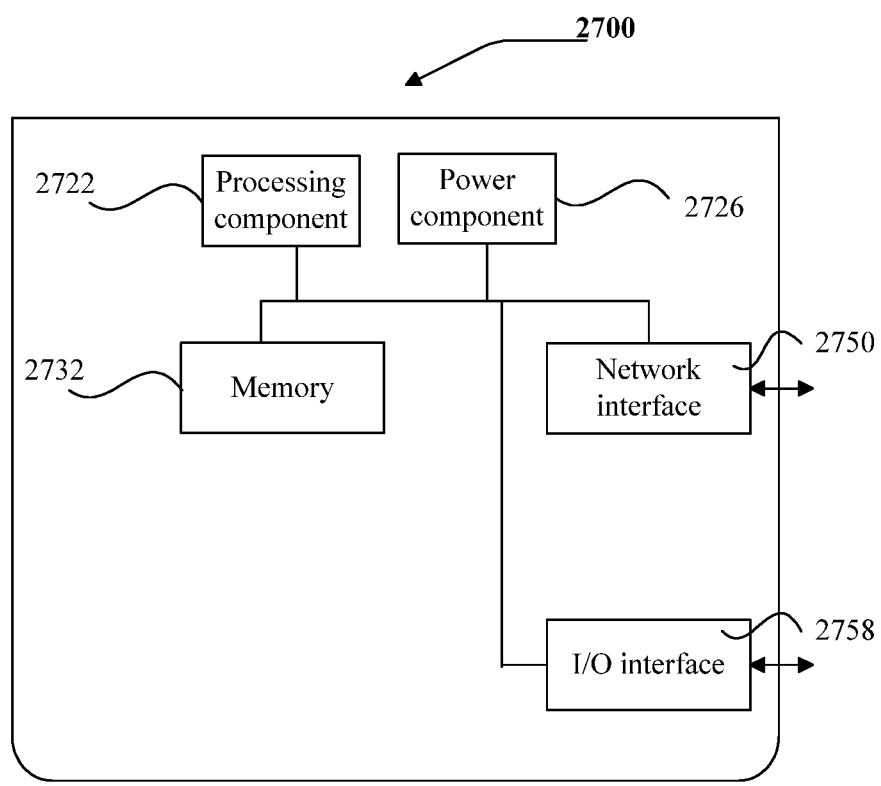
FIG. 27 is a block diagram of a device, according to an example.

FIG. 27 is a block diagram of an information display device 2700, according to an example. For example, the device 2700 may be provided as a computer. Referring to FIG. 27, the device 2700 includes a processing component 2722 including one or more processors, and a memory resource represented by a memory 2732, configured to store instructions executable for the processing component 2722, such as application programs. The application programs stored in the memory 2732 may include one or more modules of which each corresponds to a set of instructions. In addition, the processing component 2722 may be configured to execute the instructions, so as to execute the abovementioned information display method.

The device 2700 may further include a power component 2726 configured to execute power mangement of the device 2700, a wired or wireless network interface 2750 configured to connect the device 2700 to a network, and an I/O interface 2758. The device 2700 may be operated on the basis of an operating system stored in the memory 2732, such as Windows Server™, Mac OS X™, Unix™, Linux™ or FreeBSD™.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Other examples of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure may be indicated by the following claims.

It will be appreciated that the present disclosure is not limited to the exact construction that has been described above and illustrated in the accompanying drawings, and that various modifications and changes may be made without departing from the scope thereof.

What is claimed is:

1. An information display method, implemented by a terminal comprising:
   displaying a user interface of an application, the user interface comprising at least one picture;
   receiving a gesture operation performed on the user interface, wherein the gesture operation is configured to select a target picture from the at least one picture, and the gesture operation comprises at least one of a long pressing operation, a pressure touch operation, a multiple click operation, a suspended touch operation or a double finger touch operation;
   determining content types of the target picture according to the content of the target picture;
   the content type comprises: a character type, and the corresponding search target comprises at least one of: a friend photo in one of local applications, friend contact information in one of the local applications, social account information of a public character in the Internet, news information of a public character in the Internet, or resume information of a public character in the Internet;
   the content type comprises: a place type, and the corresponding search target comprises at least one of: description information of a place, navigation information of the place on one of the local applications or a network, or map previewing information of the place on one of the local applications or the network;
   the content type comprises: an article type, and the corresponding search target comprises at least one of: article description information, detail page information of an e-commerce platform, or comment information for an article; and
   the content type comprises: a work cover type, and the corresponding search target comprises at least one of: work description information, detail page information of an e-commerce platform, or comment information for a work;
   determining a search target according to the content type; and
   acquiring search result information corresponding to content of the target picture;
   wherein acquiring search result information corresponding to the content of the target picture comprises:
   searching the search target according to the content of the target picture to acquire the search result information corresponding to the content of the target picture;
   displaying the search result information: and
   receiving a slide operation performed on the user interface for the displayed search result information, wherein the slide operation comprises: hiding a first part of the search result information that is slid out of a display region, and displaying a second part of the search result information that is slid in the display region.

2. The method of claim 1, wherein displaying the search result information comprises:
   displaying the search result information in a superimposed manner on a local region of the user interface.

3. The method of claim 1, wherein acquiring the search result information corresponding to the content of the target picture comprises:
   identifying the content of the target picture;
   acquiring the search result information corresponding to the content of the target picture through a local search program, or sending a search request containing identified content information of the target picture to a server for instructing the server to search the search result information corresponding to the content of the target picture; and
   receiving the search result information returned by the server when sending the search request to the server.

4. The method of claim 1, wherein acquiring the search result information corresponding to the content of the target picture comprises:
   sending a search request containing picture data of the target picture to a server for instructing the server to identify the content of the target picture and search information associated with the content of the target picture; and
   receiving the search result information returned by the server.

5. The method of claim 1, further comprising:
   acquiring an application context of the application where the target picture is located, the application context comprising at least one of: an identifier of the application or an identifier of the user interface; and
   wherein determining the search target according to the content type comprises:
   determining the search target according to the content type and the application context.

6. The method of claim 5, wherein:
   when the content type is a character type and the application context comprises at least one of a phonebook application context or an album application context, the search target corresponding to the content type and the application context comprises at least one of: a friend photo in one of local applications or friend contact information in one of the local applications; and
   when the content type is the character type and the application context comprises a news application context, the search target corresponding to the content type and the application context comprises at least one of: social account information of a public character in the Internet, news information of a public character in the Internet, or resume information of a public character in the Internet.

7. The method of claim 1, wherein the content of the target picture comprises objects;

and wherein determining the content type of the target picture according to the content of the target picture comprises:
determining the content type of the target picture according to the objects; and
wherein acquiring the search result information corresponding to the content of the target picture comprises:
acquiring the search result information corresponding to the objects.

8. The method of claim 1, further comprising:
displaying objects comprised in the content of the target picture, wherein a number of the objects is more than one; and
receiving a selection operation for the objects to select a target object from the more than one object;
wherein acquiring the search result information corresponding to the content of the target picture comprises:
acquiring the search result information corresponding to the target object.

9. The method of claim 1, further comprising:
determining a region indicated by the gesture operation; and
wherein acquiring the search result information corresponding to the content of the target picture comprises:
when the region indicated by the gesture operation comprises a partial content of the target picture, acquiring the search result information corresponding to the partial content of the target picture.

10. An information display device, comprising:
a processor; and
a memory for storing instructions executable for the processor; wherein the processor is configured to:
display a user interface of an application, wherein the user interface comprises at least one picture;
receive a gesture operation performed on the user interface, wherein the gesture operation is configured to select a target picture from the at least one picture, and the gesture operation comprises at least one of a long pressing operation, a pressure touch operation, a multiple click operation, a suspended touch operation or a double-finger touch operation;
determine content types of the target picture according to the content of the target picture;
the content type comprises: a character type, and the corresponding search target comprises at least one of: a friend photo in one of local applications, friend contact information in one of the local applications, social account information of a public character in the Internet, news information of a public character in the Internet, or resume information of a public character in the Internet;
the content type comprises: a place type, and the corresponding search target comprises at least one of: description information of a place, navigation information of the place on one of the local applications or a network, or map previewing information of the place on one of the local applications or the network;
the content type comprises: an article type, and the corresponding search target comprises at least one of: article description information, detail page information of an e-commerce platform, or comment information for an article; and
the content type comprises: a work cover type, and the corresponding search target comprises at least one of: work description information, detail page information of an e-commerce platform, or comment information for a work;
determine a search target according to the content type; and
acquire search result information corresponding to content of the target picture;
wherein acquiring search result information corresponding to the content of the target picture comprises:
search the search target according to the content of the target picture to acquire the search result information corresponding to the content of the target picture;
display the search result information; and
receive a slide operation performed on the user interface for the displayed search result information, wherein the slide operation comprises: hide a first part of the search result information that is slid out of a display region, and display a second part of the search result information that is slid in the display region.

11. The device of claim 10, wherein the processor is further configured to:
display the search result information in a superimposed manner on a local region of the user interface.

12. The device of claim 10, wherein the processor is further configured to:
identify the content of the target picture;
acquire the search result information corresponding to the content of the target picture through a local search program, or send a search request containing identified content information of the target picture to a server for instructing the server to search the search result information corresponding to the content of the target picture; and
receive the search result information returned by the server when the search request is sent to the server.

13. The device of claim 10, wherein the processor is further configured to:
send a search request containing picture data of the target picture to a server for instructing the server to identify the content of the target picture and search information associated with the content of the target picture; and
receive the search result information returned by the server.

14. The device of claim 10, wherein the processor is further configured to:
determine a content type of the target picture according to the content of the target picture; and
determine a search target according to the content type; and
search the search target according to the content of the target picture to acquire the search result information corresponding to the content of the target picture.

15. The device of claim 14, wherein the processor is further configured to:
acquire an application context of the application where the target picture is located, wherein the application context comprises at least one of: an identifier of the application or an identifier of the user interface; and
determine the search target according to the content type and the application context.

16. The device of claim 14, wherein the content of the target picture comprises objects; and
the processor is further configured to:
determine the content type of the target picture according to the objects; and
acquire the search result information corresponding to the objects.

17. The device of claim 10, wherein the processor is further configured to:

display objects comprised in the content of the target picture, wherein a number of the objects is more than one;
receive a selection operation for the objects to select a target object from the more than one object; and
acquire the search result information corresponding to the target object.

18. A non-transitory computer-readable storage medium having stored therein instructions that, when executed by a processor of a mobile terminal, cause the processor to perform:
displaying a user interface of an application, wherein the user interface comprises at least one picture;
receiving a gesture operation performed on the user interface, wherein the gesture operation is configured to select a target picture from the at least one picture and the gesture operation comprises at least one of a long pressing operation, a pressure touch operation, a multiple click operation, a suspended touch operation or a double-finger touch operation;
determining content types of the target picture according to the content of the target picture;
the content type comprises: a character type, and the corresponding search target comprises at least one of: a friend photo in one of local applications, friend contact information in one of the local applications, social account information of a public character in the Internet, news information of a public character in the Internet, or resume information of a public character in the Internet;
the content type comprises: a place type, and the corresponding search target comprises at least one of: description information of a place, navigation information of the place on one of the local applications or a network, or map previewing information of the place on one of the local applications or the network;
the content type comprises: an article type, and the corresponding search target comprises at least one of: article description information, detail page information of an e-commerce platform, or comment information for an article; and
the content type comprises: a work cover type, and the corresponding search target comprises at least one of: work description information, detail page information of an e-commerce platform, or comment information for a work;
determining a search target according to the content type; and
wherein acquiring search result information corresponding to the content of the target picture comprises:
searching the search target according to the content of the target picture to acquire the search result information corresponding to the content of the target picture;
acquiring search result information corresponding to content of the target picture;
displaying the search result information; and
receiving a slide operation performed on the user interface for the displayed search result information, wherein the slide operation comprises: hiding a first part of the search result information that is slid out of a display region, and displaying a second part of the search result information that is slid in the display region.

* * * * *